Jan. 28, 1930. E. N. FOX 1,745,212
ORNAMENTAL LIGHT FOR CHRISTMAS TREES
Filed Sept. 12, 1928
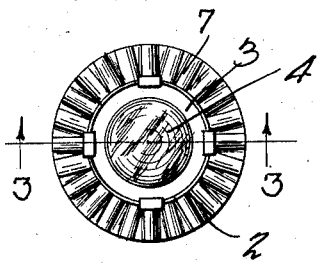
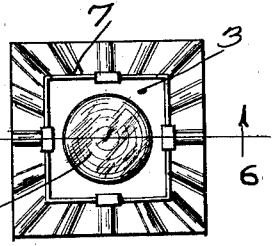
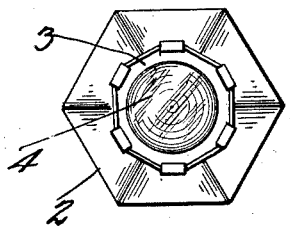
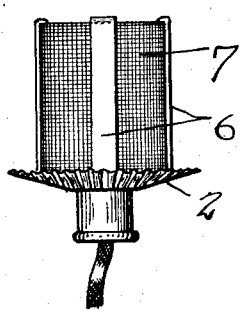
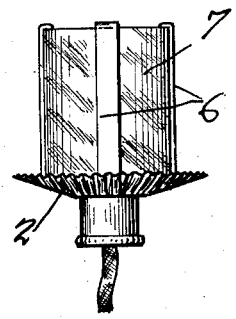
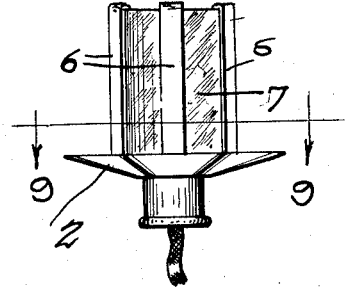
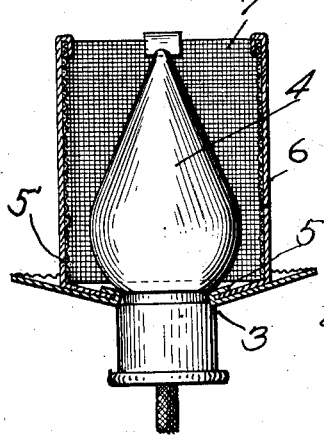
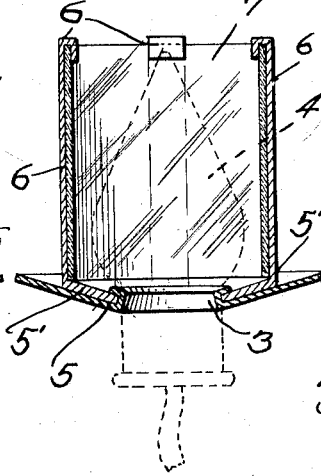
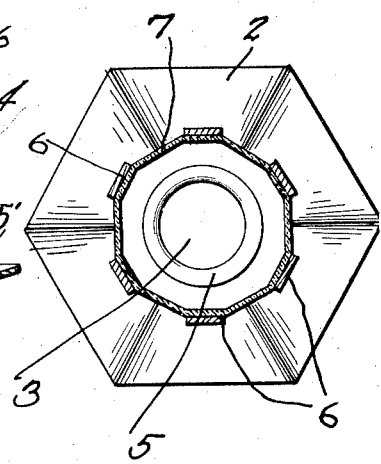
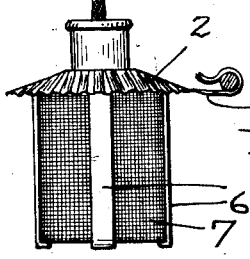
INVENTOR.
Everett N. Fox.
BY Milton E. Lowry
ATTORNEY.

Patented Jan. 28, 1930

1,745,212

UNITED STATES PATENT OFFICE

EVERETT N. FOX, OF MILWAUKEE, WISCONSIN

ORNAMENTAL LIGHT FOR CHRISTMAS TREES

Application filed September 12, 1928. Serial No. 305,439.

This invention has relation to ornamental devices intended and adapted to be hung on Christmas trees and the like, and has for its object the provision of certain decorative appendages, in the nature of lanterns or guards to be applied to and enclose the small electric lamp bulbs which are customarily hung upon the branches of the trees.

The invention contemplates the production and application to the usual Christmas tree decoration, of certain devices which will serve both useful and ornamental purposes, and consists in the novel construction of a light guard shield or protector, which may be easily applied to use and which will be of simple and comparatively inexpensive character.

In the accompanying drawing,

Figure 1 is an underside plan view of a shield or lantern embodying my invention in one of the preferred forms;

Figure 2 is a side view of the same;

Figure 3 is a vertical central sectional view on the line 3—3 of Figure 1, showing the guard or lantern with an enclosed lamp;

Figure 4 is an underside view of a modified form of the device;

Figure 5 is a side view illustrating a further modification;

Figure 6 is a sectional view of the device without the lamp;

Figure 7 is an underside view of a further modification;

Figure 8 is a side view of the device shown in Figure 7.

Figure 9 is a section on the line 9—9 of Figure 8, and

Figure 10 is a side view of a modification intended to be used without a lamp.

The numeral 2 designates a circular metallic disk or plate of an ornamental character, such ornamentation being cheaply and expeditiously produced by means of a die forming corrugations or other designs.

This disk or plate is formed with a central opening 3, adapted for the insertion therethrough of the neck of a light bulb 4, which is embraced by the edges of the aperture and held in position by frictional contact.

The edge of the plate surrounding the aperture is clinched outwardly, as shown at 5, to form a clamp for the introverted ends 5', of the metallic strips 6, which are positioned above the plate 2 and are spaced apart as shown in the drawings, to form an open cage for the reception of the cylindrical shield or protector 7, which may be of glass, mica, wire cloth or other suitable transparent or translucent material, and which is held in place by bending over and inwardly the ends of the strips.

The shield or protector will be preferably formed of colored glass, and when the device is used for its intended purposes the lights will be of different colors.

As shown in Figures 4, 5, 6, 7, 8 and 9, the device may be of different forms, such as square, pentagonal, etc., instead of cylindrical as shown in Figure 1.

In Figure 10 there is shown a modification of the device which is intended to be hung on a Christmas tree, as an additional ornament, but without a lamp.

In this form of the device the plate 2 is formed with or has attached to it a projecting clamping hook 8, which may be snapped over a small branch or other appendage, and which will be sufficiently illuminated by the adjacent lights.

Minor changes may be made, such as will fall within the scope of the invention as claimed.

What I claim is:

1. A Christmas tree decoration consisting of a miniature lantern or shield, comprising a base plate with a central aperture flanged outwardly, cage forming strips bent inwardly at their lower ends and clamped by said flange, and a transparent cylinder fitted within said cage, and held in place by the upper bent end of the strips, said cylinder forming a shield or protection for an electric light bulb.

2. A Christmas tree decoration consisting of a miniature lantern or shield comprising a base plate with a central aperture therein, a cage formed of a ring flatly engaged with the base plate and having strips directed outwardly thereof in parallelism, the edge wall of the base plate aperture being flanged outwardly clampingly to engage the cage ring, and a transparent cylinder confined within the cage strips by bent ends at the outer ends of the strips.

In testimony whereof I affix my signature.

EVERETT N. FOX.